Oct. 23, 1928.
J. V. L. PEACOCK
1,688,984
TRACTOR DRIVEN SKIDDER
Filed Aug. 11, 1924
2 Sheets-Sheet 1
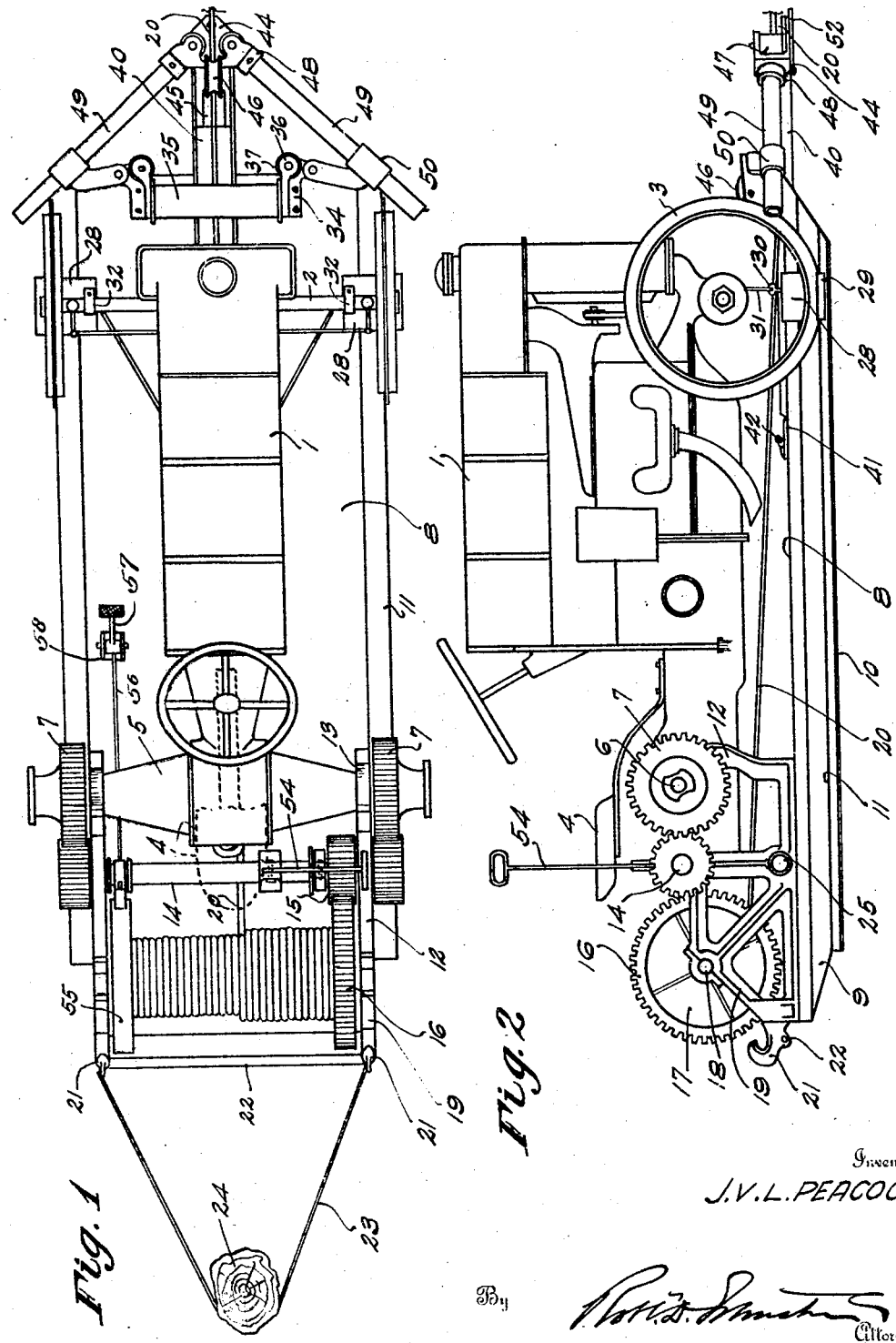
Inventor
J.V.L. PEACOCK.
By
Attorney

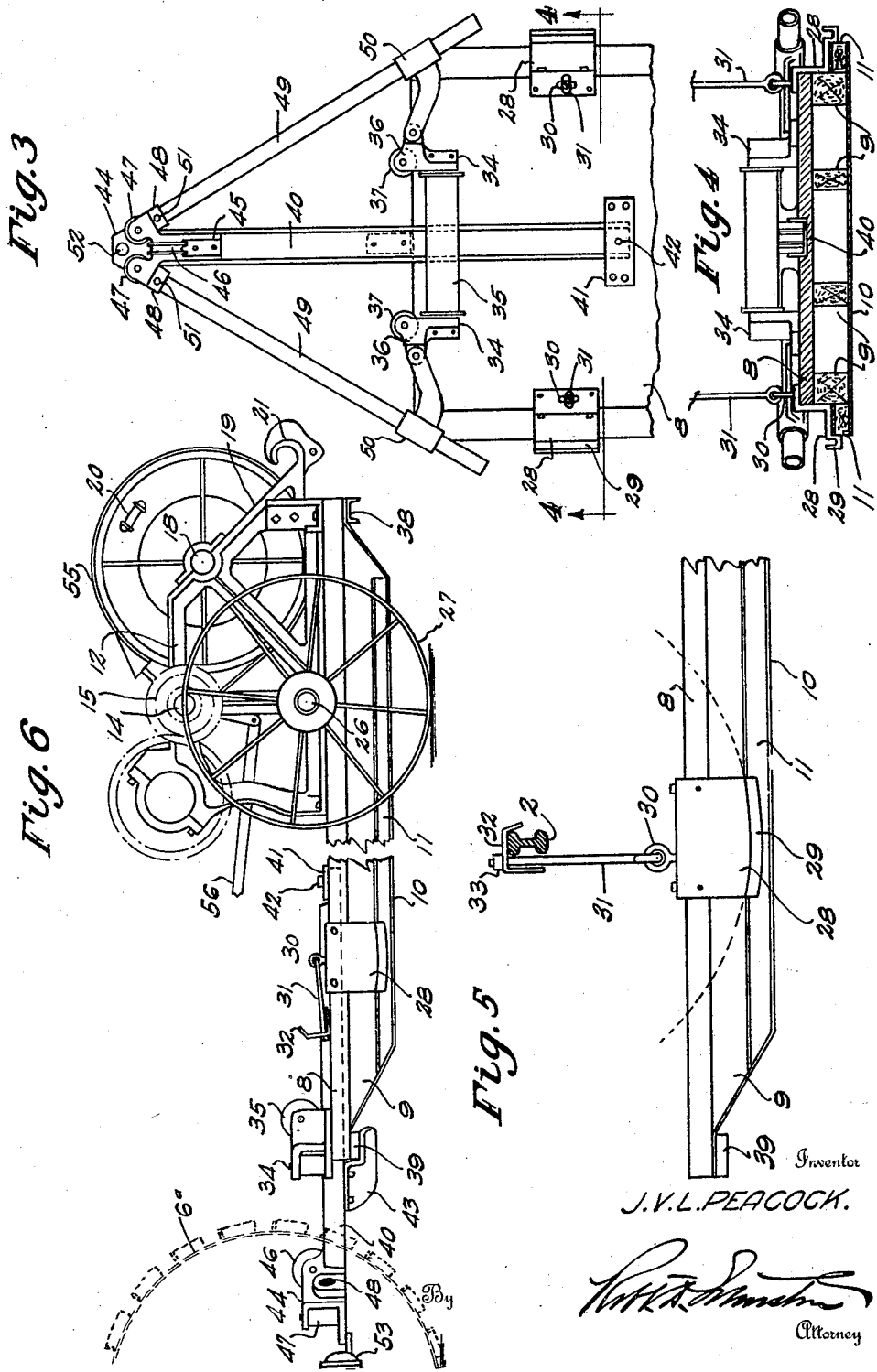

Patented Oct. 23, 1928.

1,688,984

UNITED STATES PATENT OFFICE.

JAMES V. L. PEACOCK, OF COLUMBUS, GEORGIA.

TRACTOR-DRIVEN SKIDDER.

Application filed August 11, 1924. Serial No. 731,399.

My invention relates to pulling mechanism and especially to skidders for logging, and has for its object to devise an improved attachment for tractors so that they can be converted to furnish the source of power for the mechanism as well as the means for transporting the mechanism from place to place.

My invention contemplates the provision of an improved type of skid which is preferably adapted to receive the tractor thereon so that both the front end of the tractor and its rear axle housing can be easily and positively clamped to the skid, but essentially it is designed for rigid attachment to the rear axle housing.

My invention further contemplates the removal of the rear tractor wheels and their replacement by gears, and in this respect it constitutes an improvement on, and a further adaptation of, the stump puller forming the subject matter of Letters Patent No. 1,529,912, issued to me on the 17th day of March, 1925.

A further distinctive feature of my present invention is the provision on the skid of bearings to receive an auxiliary axle upon which supporting wheels can be mounted to enable the skid, when its forward end has been coupled to the tractor draw bar, to be readily transported.

In my stump puller mechanism the gears replacing the rear wheels were caused to mesh gears on the ends of the drum shaft but for skidding purposes it is desirable that the drum should be readily connected to and disconnected from the drive and to this end I interpose an intermediate shaft having a clutch control or sliding gear for connecting the drum shaft to and disconnecting it from the intermediate shaft.

My invention further contemplates improvements in the design of the skid which is a wide flat bottomed support having at its forward end a cable roller under which the skidding rope is paid out, and having a tapered extension frame adapted to carry at its apex a cable guide and to serve to deflect the skid from side to side about stumps and like obstructions as it is drawn forward by the cable to change position, this arrangement permitting the ready shifting of the skid without requiring the remounting of its transport wheels.

My invention further contemplates mounting on the skid a brake pedal adapted to control the paying out of cable from the released drum, such pedal being in convenient position to be controlled from the seat of the tractor.

My invention further comprises the novel details of construction and arrangements of parts, which in their preferred embodiment only are illustrated in the accompanying drawings which form a part of this specification, and in which:—

Fig. 1 is a plan view of the skidding attachment anchored showing the tractor wheels removed and the rear axles geared to the skidding mechanism, the skid having its forward extension frame and cable guide in position.

Fig. 2 is a side elevation of Fig. 1, omitting the anchorage.

Fig. 3 is a detail plan view of the front end of the skid and its extension frame with the tractor omitted.

Fig. 4 is a cross-sectional view on the line 4—4 of Fig. 3.

Fig. 5 is a detail side view of the front wheel supporting plate and front axle hold-downs.

Fig. 6 shows the skid mounted on removable transport wheels and connected to the tractor draw bar for being transported.

Similar reference numerals refer to similar parts throughout the drawings.

In the embodiment of my invention, I show a typical tractor 1 having a front axle 2, front wheels 3, a seat 4, a housing 5 for its differentially driven rear axles 6 upon which the rear tractor wheels 6$^a$ are usually mounted. My invention does not contemplate any change in the standard parts of the tractor as thus far described, except that I propose to remove the rear tractor wheels and replace them with gears 7 adapted to fit the rear axles. My skidding mechanism proper comprises a skid or platform 8 preferably supported by longitudinal members 9 which have attached to their bottom edges a metal plate 10, this plate extending the full width of the platform. The sills are tapered upwardly at each end to give the plate an upward slope, thus making the skid ride more readily over the ground when it is dragged forward or back. I prefer to make the skid long enough so that a depressed run way 11 on each side of it will receive the front tractor wheels when the tractor is backed onto the skid so as to bring its rear axle housing into position above the bearing seats therefor in the pedestals 12 which are adapted to receive and support the rear end of the tractor when its rear wheels have been removed. It is only essential that the skid support, and be held rigid with, the rear axle housing. A cap 13 is clamped to each pedestal over the housing 5 so as to rigidly connect the housing to the pedestal. An intermediate shaft 14 is suitably journaled in the pedestals and carries a sliding gear 15 splined thereto and adapted to be moved into and out of mesh with a large gear 16 fast on the drum 17. The drum is mounted upon an axle 18 journaled in the inclined rear end 19 of each pedestal and the drum is adapted to receive the cable 20 which is used for skidding or other pulling purposes. At their rear end the pedestals terminate in hooks 21 which are cross connected by a brace 22. These hooks are adapted to receive an anchor cable 23 by means of which the rear end of the skid can be made fast to any suitable anchor such as a stump 24. The pedestals near their bases carry aligning bearings 25 adapted to receive a removable axle 26 which, when in place will receive transport wheels 27 upon which the rear end of the skid may be supported when it is being moved for substantial distances.

I attach to the forward end of the full length skid on each side a pair of angle plates 28 upon which the front tractor wheels will seat, each plate having a concave face forming part of the run way on its respective side and having an overhung grooved concave flange 29 to receive the center rib on the front tractor wheel. The upper end of this plate overlaps and is bolted to the skid platform and carries an eye stud 30 which receives an eye bolt 31 that carries at its upper end a clamp member 32 adapted to be engaged over the front tractor axle 2 and to be clamped against the latter by a nut 33 on the eye bolt. In this way the forward end of the tractor also can be firmly interlocked and braced to the skid and the tractor and skid held against relative movement, which is more important for stump pulling than for skidding. At its front end in the center the skid carries a casting 34 having a pair of perforated ears in which a forward rope cable roller 35 is journaled. The casting at each side provides bearings 36 for the vertical axes of side guide rollers 37 adapted to hold the cable in proper engagement with the roller while leaving it free to work laterally as it is paid off the drum.

The skid, as illustrated, has squared or stub ends which are braced by a rear cross channel 38 and a front bar 39, but any other suitable means may be used. In order that the skid may be adapted to be pulled along over the ground to different operating positions by the use of its own pulling cable when such is connected to an anchor in front of the skidding mechanism, I provide an extension frame which is triangular in plan and which comprises a central channel iron 40 adapted to fit into a countersunk recess provided in the forward end of the skid to brace the iron laterally and to enable it to be passed under the casting 34. The rear end of the channel, from which the side flanges are removed, engages under a holddown plate 41, fast on the platform. This channel end has an aperture to receive a pin 42 which will pass through a corresponding hole in the hold-down plate 41 and thus secure the channel to the skid. A bracket 43 is bolted to the underside of the channel and engages under the bar 39 at the forward end of the skid so as to hold the front end of the channel down when its rear end has been secured by the pin 42 in working position on the skid. At the front end of the channel I mount a casting 44 having a rear extension 45 that fits between the side flanges of the channel and is bolted thereto. This bracket provides a transverse horizontal journal for a sheave 46 and also spaced vertical journals for a pair of side guide rollers 47 set in advance of the sheave. The casting has rearwardly opening divergent sockets 48 adapted to receive pipes or rods 49 that extend towards each of the front corners of the skid and are there received in eyes or bearings 50 formed by castings suitably bolted to the skid. A pin 51 is provided in each socket to fasten a pipe 49 demountably therein. The casting 44 has a forward extension with a hole 52 therein, by means of which it can be coupled to the rear draw bar 53 of the tractor. The rearwardly divergent rods 49 form with the channel a triangular or tapered front end for the skid which will divert it from side to side as it strikes obstructions when being skidded forward by drawing in on the cable against a front anchor. After the skidding mechanism has been relocated and an anchor provided for its rear end, this front extension, including the channel and the side pipes 49, can be removed from the skid and the skidding operation carried on.

Ordinarily it is desirable that the skidding cable be paid off rapidly and to this end a shift lever 54 is provided, in convenient position for operation by a driver on the tractor seat to move the gear on the intermediate shaft out of mesh with the drum gear, whereupon the cable will pull off freely until it is again attached to its load, thereupon the lever 54 is again shifted to couple the drum to the intermediate shaft and the tractor, through its rear axles and the gearing shown will drive the drum and pull the logs or other load with great power in the desired manner. I provide the drum with a brake band 55 and operate this brake band by a pull rod 56 extending forward to the brake lever 57 pivoted to a bracket 58 on the skid in position to be conveniently operated by the foot of an operator seated on the tractor seat.

When it is desired to move the skidding mechanism for substantial distances, the gears 7 are detached from the rear axles, the clamps are released from the front tractor axle, and the rear tractor wheels are replaced on the rear axles. The housing 5 is released from the pedestals and the tractor moves off under its own power. The removable axle 26 is then introduced in the bearings provided therefor in the pedestals and the transport wheels 27 are mounted on it. The channel iron 40 is then mounted in position in the manner described and coupled to the draw bar of the tractor and the whole apparatus can then be readily transported.

Having thus described my invention, what I claim as new and desire to secure by Letters Patent, is:—

1. An attachment for converting tractors into skidders and the like, comprising a light portable skid onto which the tractor wheels are adapted to be run, pedestals on the skid adapted to support the rear axle housing of the tractor after the rear tractor wheels have been removed, means to rigidly fasten said tractor housing in position on the skid, gears adapted to replace said rear tractor wheels, a cable drum driven by said gears, means to mount said drum on the skid, and means to anchor the skid, said skid having depressed side run ways adapted to receive the tractor wheels.

2. An attachment for converting tractors into skidders and the like, according to claim 1, in which the skid comprises a raised center platform supported on longitudinal members and in which the side run ways for the tractor wheels are lower than said platform, said longitudinal members being tapered upwardly at their ends and having a sheet metal supporting surface attached to their under sides.

3. Means to convert a tractor having rear axles and a housing therefor into a skidder and the like, comprising a skid having side run ways to receive the tractor wheels, a demountable extension near the front of the tractor, detachable angular braces connecting the extension to the skid and removable to clear said run ways, anchorage connections for the skid, means to rigidly mount the rear axle housing of the tractor on the skid, gears to replace the rear wheels on the rear axles of the tractor, a countershaft mounted on the skid and having gears meshing both rear axle gears, a drum having a shaft mounted on the skid, a gear drive for the drum from the countershaft, and means to connect and disconnect said latter drive.

4. An attachment for converting tractors into skidders and the like, comprising a light portable skid adapted to be rigidly clamped to the rear end of the tractor and support it with its rear wheels removed, a gear driven drum mounted on said skid, gears replacing the rear tractor wheels and adapted to drive said drum, a triangular front end extension on the skid with a guide for the skidding cable at its apex, means on said extension to couple it to a tractor draw bar, and means to mount temporary transport wheels on the skid.

5. An attachment for converting a tractor into a skidder and the like, comprising a skid having rear supports for the rear end of the tractor and means to clamp the tractor to said supports, a drum shaft mounted on the skid, a transmission at each side to drive said drum shaft from the rear axles of the tractor, a forward extension guide carried by the skid for a pulling cable wound on said drum, said guide having a hold-down pulley under which the cable runs.

6. An attachment for converting a tractor having rear axles and a housing therefor into a skidder, comprising a skid, means to rigidly mount the rear axle housing of the tractor on the skid, gears to replace the rear wheels of the tractor, a drum and mechanism mounted on the skid to drive the drum from said gears, means to detachably mount transport wheels on the skid, a cable guide extension provided on one end of the skid, and means provided on the cable guide extension to couple it to the tractor draw bar.

7. An attachment for converting tractors into skidders and the like, comprising a light portable skid adapted to be rigidly clamped to the rear end of the tractor and support it with its rear wheels removed, a gear driven drum mounted on said skid, gears replacing the rear tractor wheels and adapted to drive said drum, a triangular front end extension on the skid with a guide for the skidding cable at its apex, and means on said extension to couple it to a tractor draw bar.

8. An attachment for converting a tractor into a skidder and the like, comprising a skid having rear supports for the rear end of the tractor and means to clamp the tractor to said supports, a drum shaft mounted on the skid, a transmission at each side to drive said drum shaft from the rear axles of the tractor, a forward extension guide carried by the skid for a pulling cable wound on said drum, said guide having a hold-down means under which the cable runs.

9. A tractor driven skidder comprising a slidable skid base supporting the entire tractor and having a triangular prow, means on the skid base for securing the rear axle housing of the tractor, gears for replacing the rear tractor wheels, a drum mounted on the skid base and driven from the gears, a pulling cable on the drum, and guide means for the cable on the prow of the skid base whereby the skid with tractor mounted thereon may be easily dragged over rough ground by securing the end of the cable at a point remote from the skid and winding the cable on the drum.

In testimony whereof I affix my signature.

JAMES V. L. PEACOCK.